United States Patent
Yamato et al.

(10) Patent No.: US 11,468,082 B2
(45) Date of Patent: Oct. 11, 2022

(54) DATA PROCESSING APPARATUS, DATA PROCESSING METHOD, AND DATA PROCESSING PROGRAM STORED ON COMPUTER-READABLE STORAGE MEDIUM

(71) Applicant: OMRON Corporation, Kyoto (JP)

(72) Inventors: Tetsuji Yamato, Yokohama (JP); Taiji Yoshikawa, Kizugawa (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/268,968

(22) PCT Filed: Feb. 21, 2019

(86) PCT No.: PCT/JP2019/006424
§ 371 (c)(1),
(2) Date: Feb. 17, 2021

(87) PCT Pub. No.: WO2020/049759
PCT Pub. Date: Mar. 12, 2020

(65) Prior Publication Data
US 2021/0311959 A1    Oct. 7, 2021

(30) Foreign Application Priority Data
Sep. 6, 2018 (JP) .............. JP2018-167017

(51) Int. Cl.
*G06F 17/00* (2019.01)
*G06F 16/25* (2019.01)
*G06F 16/23* (2019.01)

(52) U.S. Cl.
CPC ........ *G06F 16/254* (2019.01); *G06F 16/2365* (2019.01)

(58) Field of Classification Search
CPC ........ G06F 16/13; G06F 16/24; G06F 16/156; G06F 16/254; G06N 3/00; G06N 5/00; G05B 13/00
See application file for complete search history.

(56) References Cited

U.S. PATENT DOCUMENTS

| | | | |
|---|---|---|---|
| 9,116,858 B1 * | 8/2015 | Yokoi | .............. H04L 67/1097 |
| 2004/0140991 A1 * | 7/2004 | Trotta | ................. G06T 17/00 |
| | | | 715/700 |

(Continued)

FOREIGN PATENT DOCUMENTS

| | | |
|---|---|---|
| JP | 2005-150882 A | 6/2005 |
| JP | 2008-217160 A | 9/2008 |

(Continued)

OTHER PUBLICATIONS

Toshihiko Oda et al., "An Approach to Defining, Generating and Utilizing Metadata for Sensing Data Trading Market", Jun. 8, 2018, pp. 1-2, The 32nd Annual Conference of the Japanese Society for Artificial Intelligence 2018, The Japanese Society for Artificial Intelligence, Relevance is indicated in the (translated) ISR/WO dated Apr. 9, 2019.

(Continued)

*Primary Examiner* — Hung D Le
(74) *Attorney, Agent, or Firm* — Metrolex IP Law Group, PLLC (57) ABSTRACT

A first data format may include real data. A second data format and a third data format each may include real data and metadata indicative of an attribute of the real data. The second data format may include the real data and the metadata in data units different from each other. The third data format may include the real data and the metadata in a single data unit. A program may cause a processor to convert, in response to an input data being in the first data (Continued)

format or in the third data format, the data format of the input data to generate output data in the second data format.

12 Claims, 7 Drawing Sheets

(56) References Cited

U.S. PATENT DOCUMENTS

| | | | | |
|---|---|---|---|---|
| 2007/0094583 | A1* | 4/2007 | Randall | H04N 19/154 |
| | | | | 375/E7.129 |
| 2010/0115126 | A1* | 5/2010 | Kanakadandi | G06F 16/219 |
| | | | | 709/237 |
| 2014/0297670 | A1* | 10/2014 | Arshad | G06F 40/154 |
| | | | | 707/756 |
| 2014/0372561 | A1* | 12/2014 | Hisano | G08G 1/087 |
| | | | | 709/217 |
| 2015/0339359 | A1 | 11/2015 | Takaoka et al. | |
| 2016/0210862 | A1* | 7/2016 | Hisano | G08G 1/087 |
| 2016/0371347 | A1* | 12/2016 | Aronovich | G06F 16/1748 |
| 2018/0181589 | A1* | 6/2018 | Kreiner | G06F 16/1794 |

FOREIGN PATENT DOCUMENTS

| | | |
|---|---|---|
| JP | 2014-96177 A | 5/2014 |
| WO | 2014/041826 A1 | 3/2014 |
| WO | 2014/122732 A1 | 8/2014 |
| WO | 2018/011895 A1 | 1/2018 |

OTHER PUBLICATIONS

An English translation of the International Search Report ("ISR") of PCT/JP2019/006424 dated Apr. 9, 2019.
The Written Opinion("WO") of PCT/JP2019/006424 dated Apr. 9, 2019.

* cited by examiner

| | Before conversion | After conversion |
|---|---|---|
| Unit | V | °C |
| Digits | Ten digits | Five digits |

DATA PROCESSING APPARATUS, DATA PROCESSING METHOD, AND DATA PROCESSING PROGRAM STORED ON COMPUTER-READABLE STORAGE MEDIUM

FIELD

The present invention relates to a data processing apparatus, a data processing method, and a data processing program.

BACKGROUND

WO 2014/041826 (Patent Literature 1) describes a system for circulating data, such as sensing data associated with metadata indicating the attribute of the sensing data. The system allows the user to refer to metadata and retrieve sensing data that meets the user's requests (refer to Patent Literature 1).

SUMMARY

Processing data may include processing data items in multiple different formats. For example, data items to be processed may be in one data format including metadata associated with real data as in Patent Literature 1 and in another data format including real data alone not associated with metadata. Data items in multiple different data formats may involve complicated data processing.

In response to the above issue, one or more aspects of the present invention are directed to a data processing apparatus, a data processing method, and a data processing program that facilitate data processing of input data in any format in a subsequent process.

Solution to Problem

A data processing apparatus according to an aspect of the present invention is an apparatus for processing input data to generate output data. The data processing apparatus includes a memory and a processor. The memory stores a program. The processor executes the program. The input data is in a first data format, in a second data format, or in a third data format. The first data format includes real data. Each of the second data format and the third data format includes real data and metadata indicative of an attribute of the real data. The second data format includes the real data and the metadata in data units different from each other. The third data format includes the real data and the metadata in a single data unit. The program causes the processor to convert, in response to the input data being in the first data format or in the third data format, the data format of the input data to generate output data in the second data format.

The data processing apparatus generates output data in the second data format from input data in the first data format or in the third data format. In other words, the data processing apparatus outputs data in the second data format from input data in any format. The data processing apparatus thus provides data in a common data format (second data format) to a subsequent process from input data in any format, facilitating data processing in the subsequent process.

In the above data processing apparatus, the program may further cause the processor to generate the output data in the second data format in response to the input data being in the second data format.

In the above data processing apparatus, the program may further cause the processor to output the real data included in the output data to an ETL tool being an extract, transform, and load tool.

In the above data processing apparatus, the program may cause the processor to process the metadata in accordance with a process performed on the real data by the ETL tool.

The data processing apparatus processes the metadata in accordance with the process performed on the real data by the ETL tool. The data processing apparatus thus enables the real data processed by an existing ETL tool and the metadata to remain properly associated with each other.

In the above data processing apparatus, the real data may include sensing data generated by a sensor.

A data processing method according to another aspect of the present invention is a method for processing input data to generate output data. The input data is in a first data format, in a second data format, or in a third data format. The first data format includes real data. Each of the second data format and the third data format includes real data and metadata indicative of an attribute of the real data. The second data format includes the real data and the metadata in data units different from each other. The third data format includes the real data and the metadata in a single data unit. The data processing method includes converting, in response to the input data being in the first data format or in the third data format, the data format of the input data to generate output data in the second data format.

The data processing method generates output data in the second data format from input data in the first data format or in the third data format. In other words, the data processing method outputs data in the second data format from input data in any format. The data processing method thus provides data in a common data format (second data format) to a subsequent process from input data in any format, facilitating data processing in the subsequent process.

A data processing program according to still another aspect of the present invention is a program for causing a processor to process input data to generate output data. The input data is in a first data format, in a second data format, or in a third data format. The first data format includes real data. Each of the second data format and the third data format includes real data and metadata indicative of an attribute of the real data. The second data format includes the real data and the metadata in data units different from each other. The third data format includes the real data and the metadata in a single data unit. The data processing program causes the processor to perform operations including converting, in response to the input data being in the first data format or in the third data format, the data format of the input data to generate output data in the second data format.

When executed by the processor, the data processing program causes the processor to generate output data in the second data format from input data in the first data format or in the third data format. In other words, when executed by the processor, the data processing program causes the processor to output data in the second data format from input data in any format. The data processing program thus provides data in a common data format (second data format) to a subsequent process from input data in any format, facilitating data processing in the subsequent process.

Advantageous Effects

The data processing apparatus, the data processing method, and the data processing program according to the above aspects of the present invention facilitate data processing of input data in any format in a subsequent process.

DETAILED DESCRIPTION

One or more embodiments of the present invention (hereafter, the present embodiment) will now be described in detail with reference to the drawings. The same or corresponding components in the figures are given the same reference numerals, and will not be described repeatedly. The present embodiment described below is a mere example of the present invention in any aspect. The present embodiment may be variously modified or altered within the scope of the present invention. More specifically, the present invention may be implemented as appropriate using any configuration specific to the embodiment.

1. Overview

Figure 1:
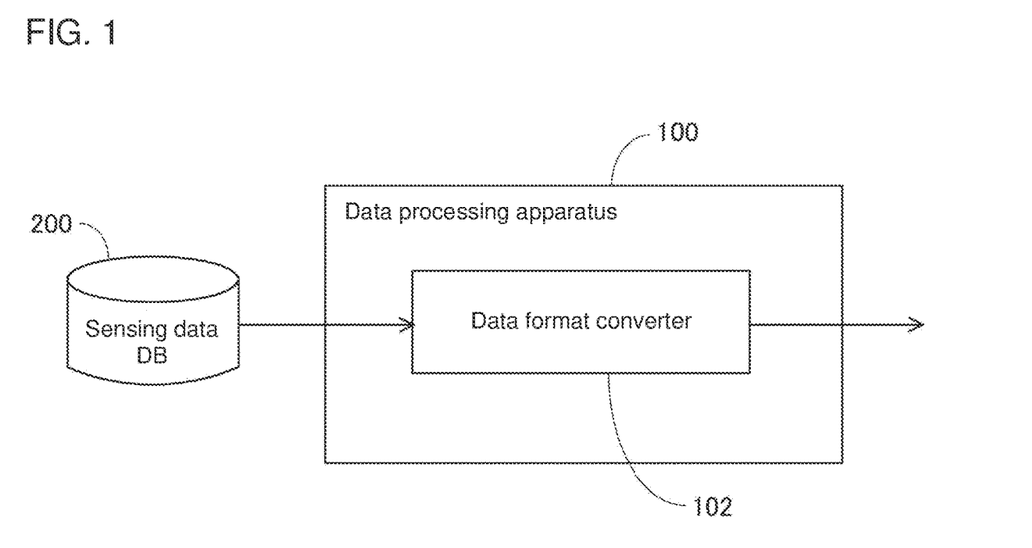
FIG. 1 is a schematic diagram illustrating a data processing server.

FIG. 1 is a schematic diagram of a data processing apparatus (data processing server) 100 according to the present embodiment. As shown in FIG. 1, the data processing server 100 is connected to a sensing data database (DB) 200 through a network. The sensing data DB 200 stores various items of sensing data. The data processing server 100 generates output data by processing sensing data input from the sensing data DB 200. The data processing server 100 outputs the generated output data to a subsequent process.

The items of sensing data stored in the sensing data DB 200 may not be in the same data format. As described in detail later, the data formats include, for example, i) a first data format including sensing data without metadata that indicates the attribute of the sensing data (hereafter simply referred to as metadata), ii) a second data format including sensing data and metadata in different data units, and iii) a third data format including sensing data and metadata together in a single data format.

Data items in different data formats may involve complicated data processing in a subsequent process. As described in detail later, the data processing server 100 according to the present embodiment includes a data format converter 102. The data format converter 102 converts the data format of input data in the first data format or in the third data format and generates output data in the second data format. In other words, the data processing server 100 outputs data in the second data format from input data in any format.

The data processing server 100 thus provides data in a common data format (second data format) to a subsequent process from input data in any format, facilitating data processing in the subsequent process. The configuration of the entire system, the hardware and software configurations of the data processing server 100, and the operation of the data processing server 100 will now be described in the stated order.

2. System Configuration

Figure 2:
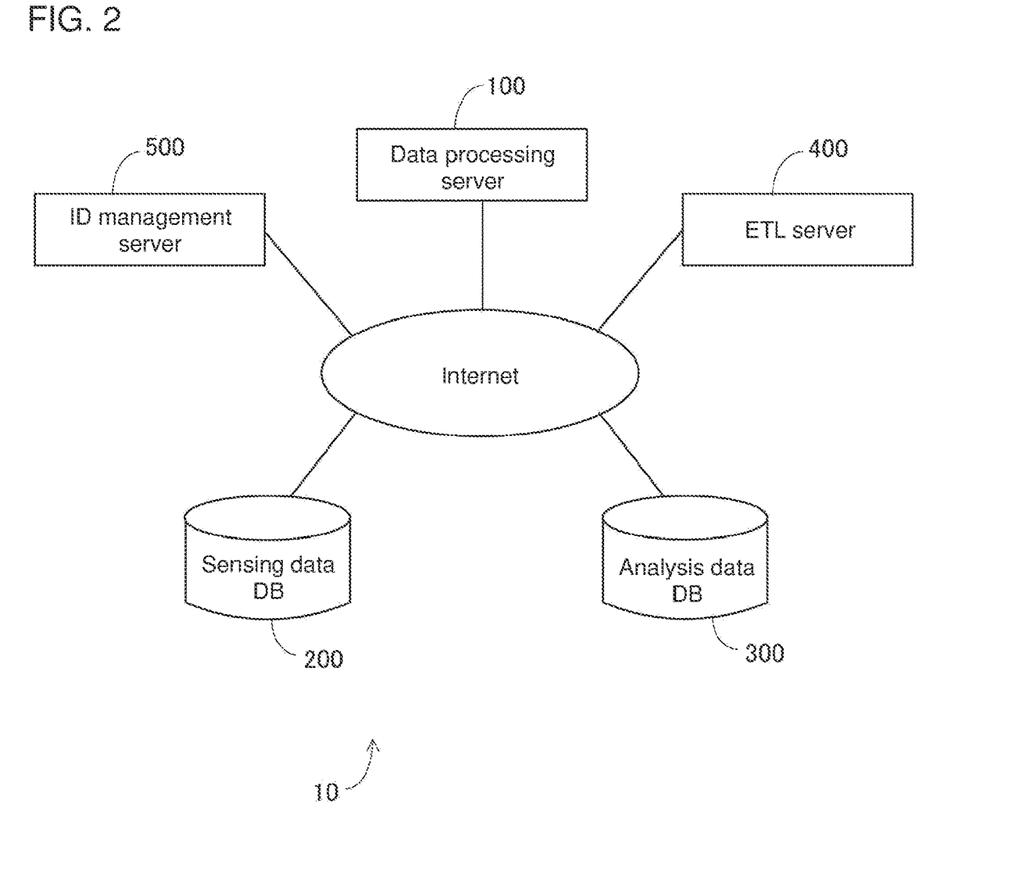
FIG. 2 is a schematic diagram illustrating an example analysis data generation system including a data processing server.

FIG. 2 is a schematic diagram of an example analysis data generation system 10 including the data processing server 100 according to the present embodiment. The analysis data generation system 10 generates data to be analyzed by data analysts based on sensing data generated by a sensor installed at, for example, a manufacturing site.

Many data analysts understand little about the situations on, for example, the manufacturing sites. Thus, many data analysts who refer to sensing data alone are unlikely to understand the meaning of the sensing data accurately. In the present embodiment, the analysis data includes sensing data (real data) and metadata that aids data analysts in understanding the sensing data. Metadata indicates the attribute of sensing data. Metadata may be generated at, for example, a manufacturing site or in the process of generating analysis data.

Data analysts can handle sensing data appropriately by referring to the metadata associated with the sensing data, thus performing appropriate data analysis.

In the example shown in FIG. 2, the analysis data generation system 10 includes the data processing server 100, the sensing data DB 200, an analysis data DB 300, the ETL server 400, and an ID management server 500.

The sensing data DB 200 stores sensing data generated by a sensor. Examples of the sensor that generates sensing data stored in the sensing data DB 200 include an image sensor (camera), a temperature sensor, a humidity sensor, an illumination sensor, a force sensor, a sound sensor, a radio frequency identification (RFID) sensor, an infrared sensor, a posture sensor, a rain sensor, a radiation sensor, and a gas sensor. The sensor may be a stationary sensor, or a mobile sensor, such as a mobile phone, a smartphone, or a tablet. The sensor may be a single sensing device or may include multiple sensing devices. The sensor may be installed for any purposes. For example, the sensor may be installed for factory automation (FA) and production management at a factory, urban traffic control, weather or other environmental measurement, healthcare, or crime prevention.

The sensing data DB 200 stores sensing data items generated by such various sensors. Thus, the data items stored in the sensing data DB 200 may not be in the same data format. For example, the sensing data DB 200 stores data items in different data formats.

Figure 3:
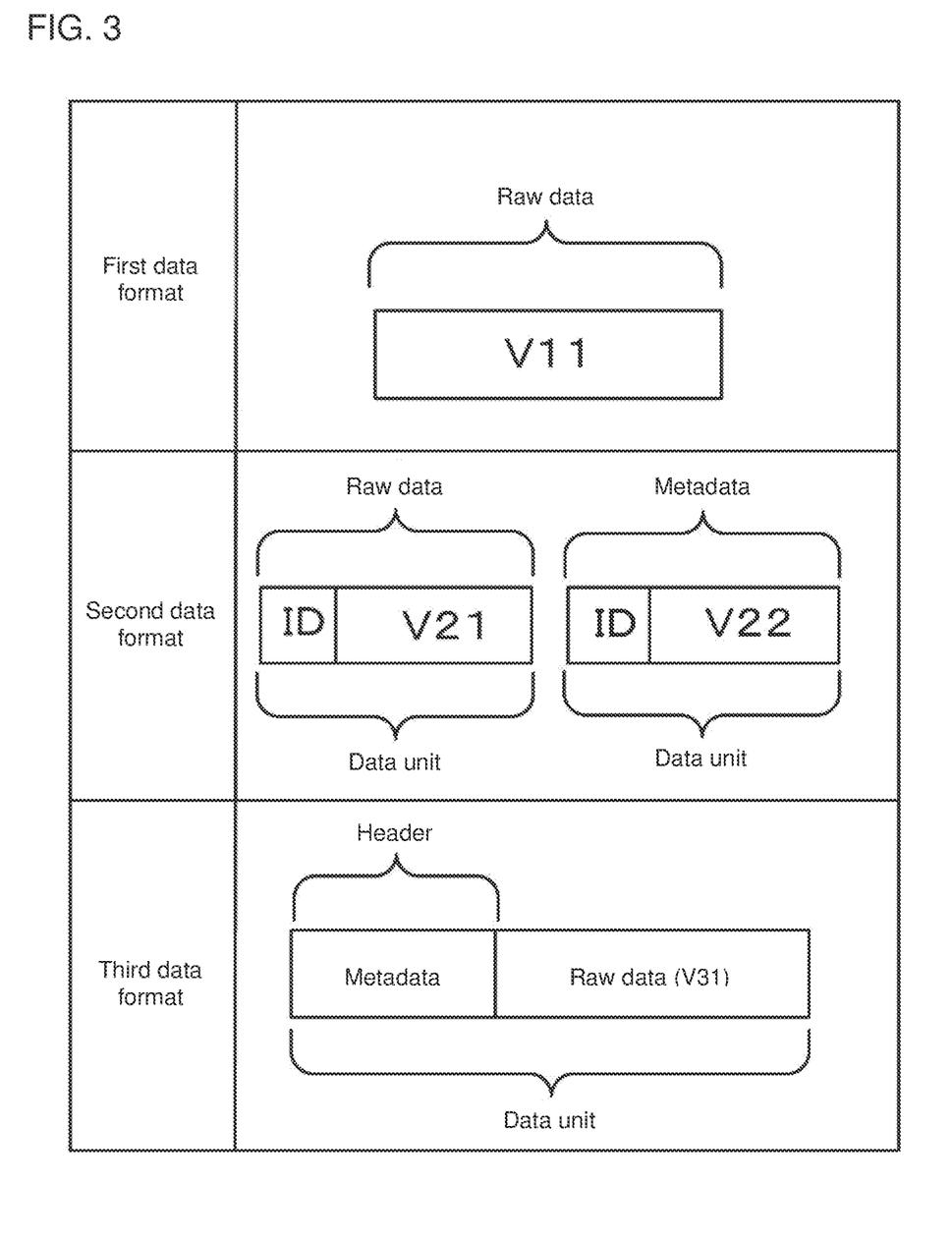
FIG. 3 is a diagram illustrating a data formats of data items stored in a sensing data database (DB).

FIG. 3 is a diagram describing the data formats of the data items stored in the sensing data DB 200. As shown in FIG. 3, a first data format includes sensing data (real data) (with no metadata). In the first data format, the sensing data includes a value V11 generated by a sensor.

A second data format includes sensing data and metadata in different data units. In the second data format, the sensing data includes an ID and a value V21 generated by a sensor.

The ID is determined in the manner described in detail later. The metadata includes an ID and a value V22 indicating the attribute of the sensing data. The sensing data and the metadata are associated with each other with a common ID included in the sensing data and the metadata.

A third data format includes sensing data and metadata that together form a single data unit. In the third data format, the data unit includes a value V31 generated by a sensor and metadata stored in the header.

Referring back to FIG. 2, the ETL server 400 implements an ETL tool. More specifically, the ETL server 400 extracts (E) data from the sensing data DB 200, transforms (T) the extracted data into a form suitable for analysis, and loads (L) the resultant data into the analysis data DB 300. The ETL server 400 will be described in detail later.

The data processing server 100 preprocesses the sensing data for which transmission is requested by the ETL server 400 from the sensing data DB 200. The data processing server 100 outputs the sensing data (real data) obtained from the sensing data DB 200 to the ETL server 400 and processes the metadata associated with the sensing data. The data processing server 100 outputs the processed metadata to the analysis data DB 300. The data processing server 100 will be described in detail later.

The analysis data DB 300 stores the sensing data processed by the ETL server 400 and the metadata processed by the data processing server 100. The processed sensing data and metadata stored in the analysis data DB 300 are easily analyzable by data analysts.

The ID management server 500 manages the IDs included in the sensing data (real data) and the metadata in the second data format. The ID management server 500 generates an ID different from any issued ID as requested by, for example, the data processing server 100 or the ETL server 400. The ID management server 500 generates, for example, a universally unique identifier (UUID). The ID management server 500 stores the transition (history) of the IDs included in the sensing data and the metadata. For example, for any ID included in an item of sensing data being changed, the ID management server 500 stores the ID(s) before and after being changed in a manner associated with the sensing data. Thus, the provider of the sensing data can, for example, track the use of the sensing data, which is provided by the provider, by accessing the ID management server 500.

3. Hardware Configuration

Figure 4:
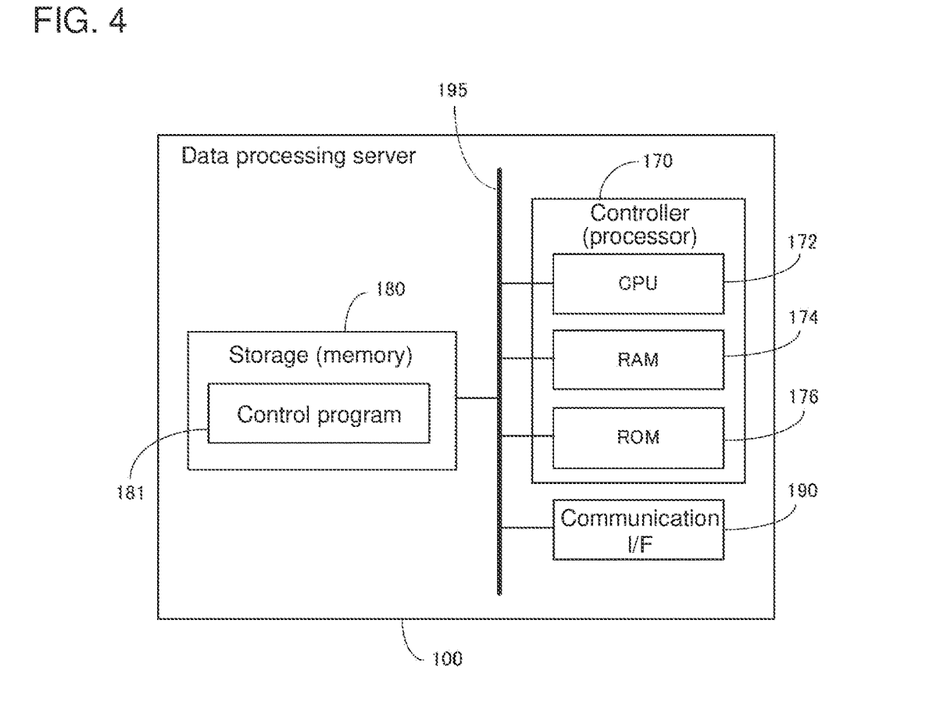
FIG. 4 is a diagram illustrating a data processing server showing an example hardware configuration.

FIG. 4 is a diagram of the data processing server 100 showing an example hardware configuration. In the present embodiment, the data processing server 100 is implemented by, for example, a general-purpose computer.

In the example shown in FIG. 4, the data processing server 100 includes a controller 170, a communication interface (I/F) 190, and a storage 180. The components are electrically connected to one another with a bus 195.

The controller 170 includes, for example, a central processing unit (CPU) 172, a random-access memory (RAM) 174, and a read-only memory (ROM) 176. The controller 170 controls the components in accordance with intended information processing.

The communication I/F 190 communicates with external devices external to the data processing server 100 (e.g., the sensing data DB 200, the analysis data DB 300, the ETL server 400, and the ID management server 500 shown in FIG. 2) through the Internet. The communication I/F 190 includes, for example, a wired local area network (LAN) module and a wireless LAN module.

The storage 180 is, for example, an auxiliary storage device such as a hard disk drive or a solid state drive. The storage 180 stores, for example, a control program 181.

The control program 181 is executable by the controller 170 to control the data processing server 100. For example, the controller 170 executes the control program 181 to implement the software modules described later. The controller 170 expands the control program 181 into the RAM 174 for executing the control program 181. The controller 170 controls the components with the CPU 172 interpreting and executing the control program 181 expanded in the RAM 174. The ETL server 400 may have the same hardware configuration as the data processing server 100.

Figure 5:
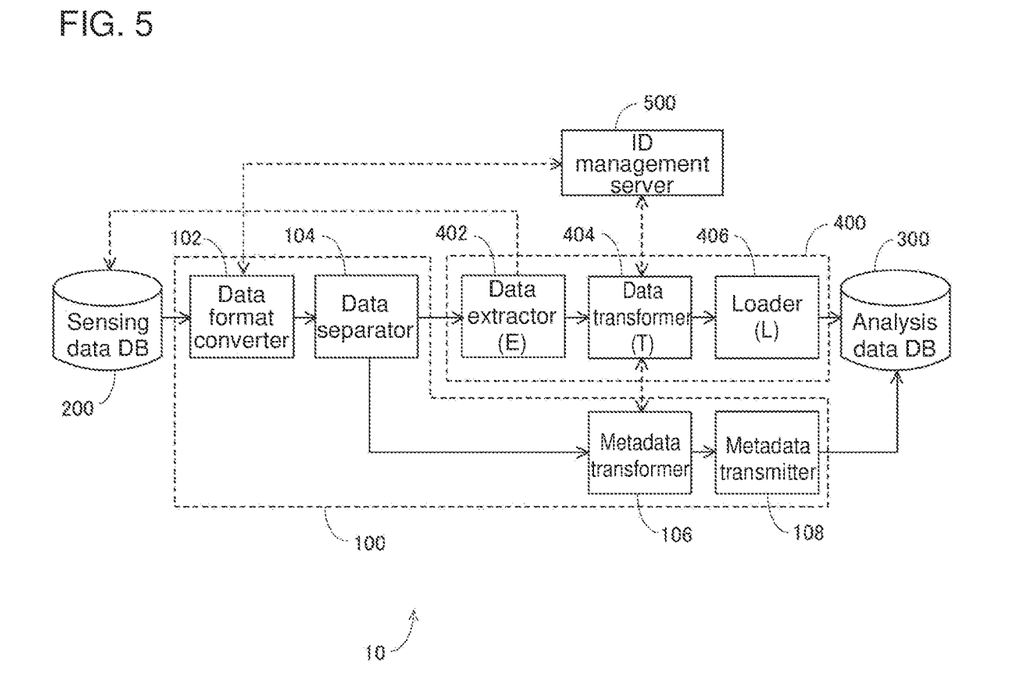
FIG. 5 is a diagram illustrating a data processing server and an extract, transform, and load (ETL) server showing example software configurations.

4. Software Configuration 4-1. Software Configurations of Data Processing Server and ETL Server FIG. 5 is a diagram illustrating the data processing server 100 and the ETL server 400 showing example software configurations. As shown in FIG. 5, the data processing server 100 includes a data format converter 102, a data separator 104, a metadata transformer 106, and a metadata transmitter 108. The data format converter 102, the data separator 104, the metadata transformer 106, and the metadata transmitter 108 are software modules implementable by the controller 170 (FIG. 4) executing the control program 181.

The ETL server 400 includes a data extractor 402, a data transformer 404, and a loader 406. The data extractor 402, the data transformer 404, and the loader 406 are software modules implementable by a controller or a processor (not shown) included in the ETL server 400 executing a control program (not shown).

The software modules start the processing in response to the data extractor 402 included in the ETL server 400 requesting the sensing data DB 200 to transmit data. More specifically, the data extractor 402 transmits an application programming interface (API) command for requesting the sensing data DB 200 to transmit data. This causes transmission of a data item stored in the sensing data DB 200 to the data format converter 102. The processing is started in this manner.

The data format converter 102 is a software module that converts input data in any data format to data in the second data format described above. The data format converter 102 determines the data format of the input data and converts the data format based on the determination result. The data generated by the data format converter 102 is output to the data separator 104. The data format converter 102 will be described in detail later.

The data separator 104 is a software module that separates the input data into sensing data (real data) and metadata. The ETL server 400 is typically designed to process real data alone. The data separator 104 thus outputs the sensing data to the data extractor 402 and the metadata to the metadata transformer 106.

The data extractor 402 outputs the input (extracted) sensing data to the data transformer 404.

The data transformer 404 is a software module that transforms the input data in accordance with, for example, a transformation rule predefined for each type of sensing data. For example, a sensing data value generated by a temperature sensor is a voltage value (V). In this case, the transformation rule includes, for example, a conversion formula from a voltage value (V) to a temperature (° C.). The data transformer 404 converts the input voltage value (V) to a temperature (° C.) in accordance with, for example, the conversion formula. In another example, sensing data generated by a sensor has ten digits. The transformation rule may define, for example, that any sensing data is to be converted to data with five digits. In this case, the data transformer 404 converts the input sensing data to data with five digits in accordance with the transformation rule.

In response to the sensing data value being converted (changed), the data transformer 404 changes the ID included in the sensing data. To change the ID, the data transformer 404 requests the ID management server 500 to issue a new ID. The data transformer 404 receives the new ID from the ID management server 500 and assigns the ID to the sensing data. The data transformer 404 outputs the resultant sensing data to the loader 406.

The loader 406 is a software module that outputs input data to the analysis data DB 300. The analysis data DB 300 stores the sensing data input from the loader 406.

The metadata transformer 106 is a software module that transforms metadata in accordance with the transformation performed on the sensing data by the ETL server 400. The resultant metadata is output to the metadata transmitter 108. The metadata transformer 106 will be described in detail later.

The metadata transmitter 108 is a software module that outputs input data to the analysis data DB 300. The analysis data DB 300 stores the metadata input from the metadata transmitter 108.

4-2. Detailed Configuration of Data Format Converter

Figure 6:
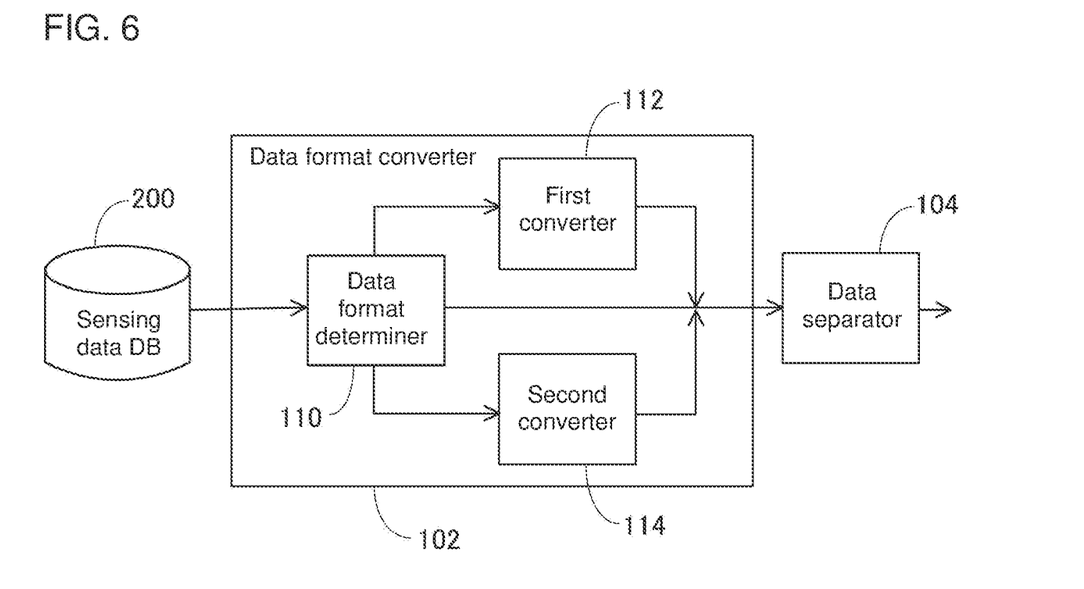
FIG. 6 is a detailed diagram illustrating a data format converter.

FIG. 6 is a detailed diagram of the data format converter 102. As shown in FIG. 6, the data format converter 102 includes a data format determiner 110, a first converter 112, and a second converter 114.

The data format determiner 110 is a software module that determines the data format of input data. The data format determiner 110 determines whether the input data is in the first, second, or third data format described above. More specifically, the data format determiner 110 determines i) whether the input data includes metadata and ii) whether the sensing data (real data) and the metadata are included in the same data unit.

Upon determining that the input data does not include metadata, the data format determiner 110 determines that the input data is in the first data format. Upon determining that the input data includes metadata and that the sensing data and the metadata are in different data units, the data format determiner 110 determines that the input data is in the second data format. Upon determining that the input data includes metadata and that the sensing data and the metadata are in a single data unit, the data format determiner 110 determines that the input data is in the third data format.

The data format determiner 110 outputs the input data determined to be in the first data format to the first converter 112. The data format determiner 110 outputs the input data determined to be in the second data format to the data separator 104. The data format determiner 110 outputs the input data determined to be in the third data format to the second converter 114. In other words, the input data determined to be in the second data format does not undergo data format conversion.

The first converter 112 is a software module that converts data in the first data format to data in the second data format. The second converter 114 is a software module that converts data in the third data format to data in the second data format.

Figure 7:
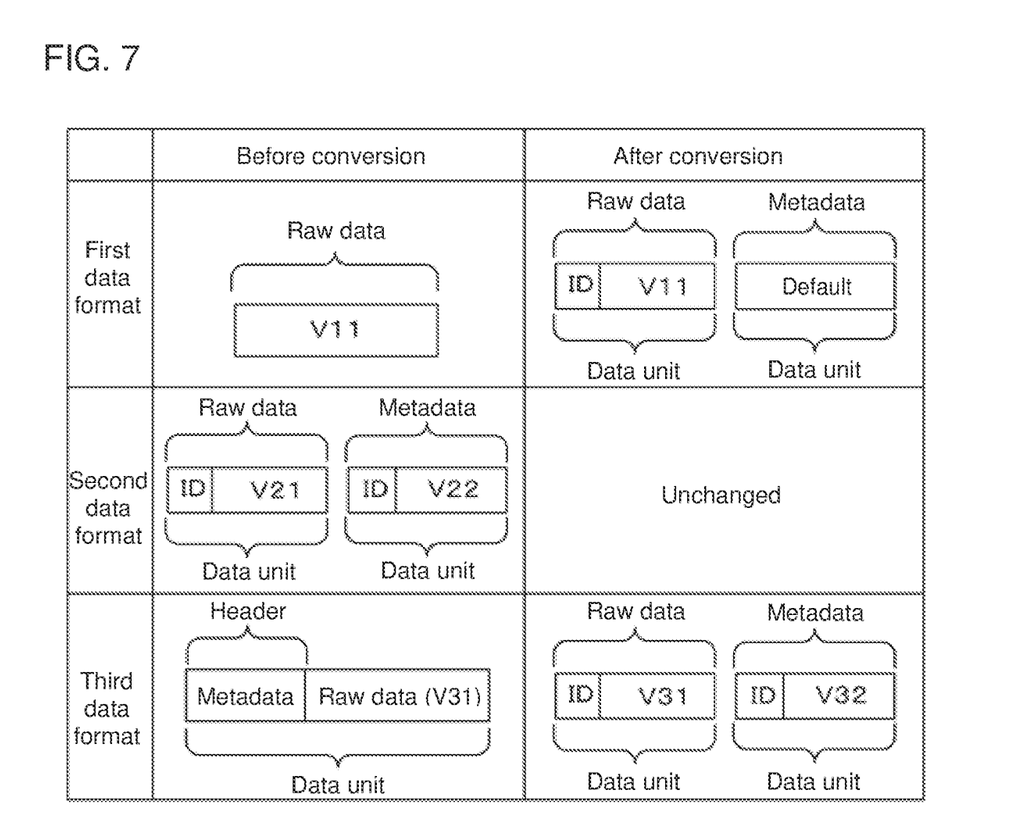
FIG. 7 is a diagram illustrating a types of data conversion performed by a data format converter.

FIG. 7 is a diagram describing the types of data conversion performed by the data format converter 102. Referring to FIG. 7, the first converter 112 converts data in the first data format to data in the second data format as described above. More specifically, the first converter 112 generates metadata having a predetermined default. The first converter 112 further requests the ID management server 500 (FIG. 5) to issue an ID and assigns the received ID to both the sensing data and the metadata. This generates the sensing data and the metadata each having an assigned common ID but in different data units.

As described above, the second converter 114 converts data in the third data format to data in the second data format. More specifically, the second converter 114 separates the sensing data and the metadata into different data units. The second converter 114 further requests the ID management server 500 (FIG. 5) to issue an ID and assigns the received ID to both the sensing data and the metadata. This generates the sensing data and the metadata each having an assigned common ID but in different data units.

Referring back to FIG. 6, the data in the data format resulting from conversion by the first converter 112 and the data in the data format resulting from conversion by the second converter 114 are output to the data separator 104.

In this manner, the data format converter 102 generates output data in the second data format from any input data that may be in the first data format or in the third data format. In other words, the data format converter 102 outputs data in the second data format from input data in any format. The data format converter 102 thus provides data in a common data format (second data format) to a subsequent process from input data in any format, facilitating data processing in the subsequent process.

4-3. Detailed Configuration of Metadata Transformer

Figure 8:
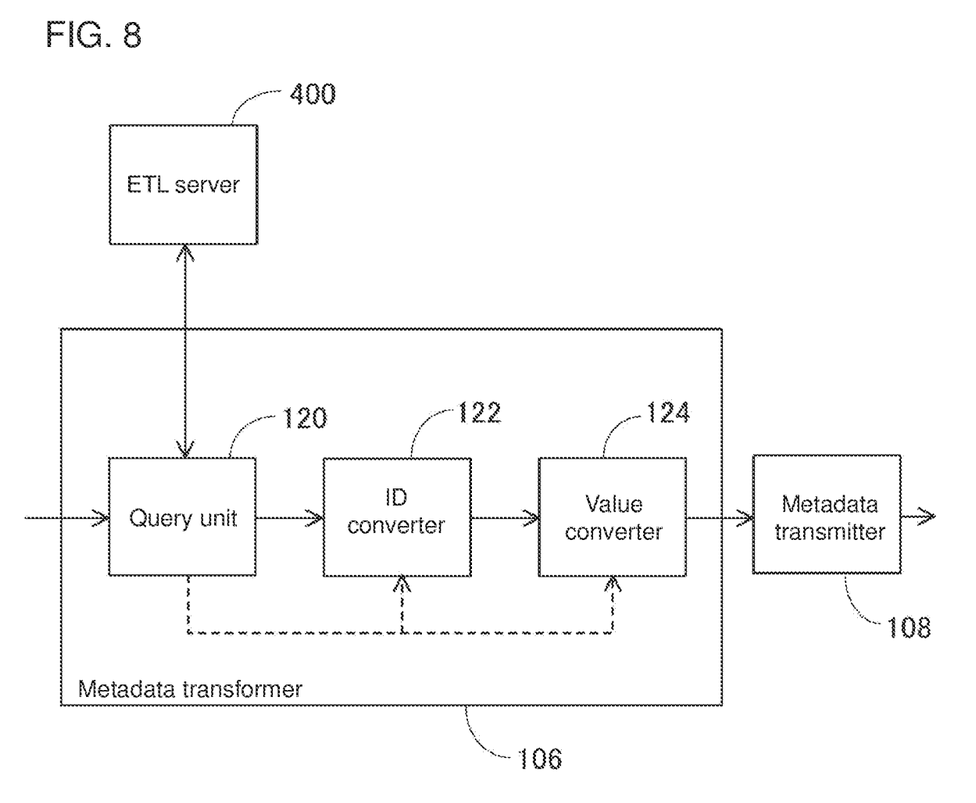
FIG. 8 is a detailed diagram illustrating a metadata transformer.

FIG. 8 is a detailed diagram of the metadata transformer 106. As shown in FIG. 8, the metadata transformer 106 includes a query unit 120, an ID converter 122, and a value converter 124.

The query unit 120 is a software module that inquires the ETL server 400 about the process performed on sensing data. For example, the query unit 120 inquires the ETL server 400 about i) whether the ID of the sensing data has been changed and the resultant ID and ii) the type of conversion performed on the sensing data value. The type of conversion of the sensing data value may be, for example, unit conversion and digit conversion. The query unit 120 receives an answer to the inquiry from the ETL server 400.

The query unit 120 outputs instructions to the ID converter 122 and the value converter 124 in accordance with the answer from the ETL server 400. More specifically, in response to the ID of the sensing data being changed by the ETL server 400, the query unit 120 outputs, to the ID converter 122, an instruction to change the ID of the metadata to the resultant ID of the sensing data. In response to the value of the sensing data being changed by the ETL server 400, the query unit 120 outputs an instruction to change the value of the metadata to a value matching the resultant sensing data value to the value converter 124.

The ID converter 122 is a software module that processes the metadata as instructed by the query unit 120. In response to the ID of the sensing data being changed by the ETL server 400, for example, the ID converter 122 changes the ID included in the metadata to the resultant ID included in the sensing data. In contrast, the ID converter 122 does not change the ID included in the metadata in response to the ID of the sensing data being unchanged by the ETL server 400. In other words, the ID converter 122 changes the ID included in the metadata simply in response to the ID included in the sensing data having been changed by the ETL server 400. This structure avoids the issuance of more IDs than used, where the number of IDs is limited.

The value converter 124 is a software module that processes the metadata as instructed by the query unit 120. In response to the value of the sensing data being converted (changed) by the ETL server 400, the value converter 124 changes the value of the metadata to a value matching the resultant sensing data value.

Figure 9:
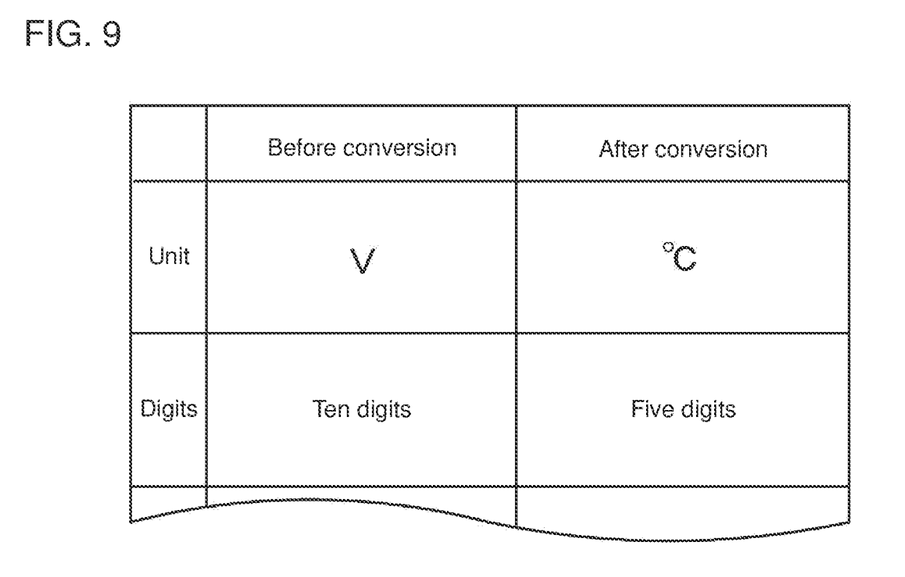
FIG. 9 is a table illustrating example metadata transformation performed by a value converter.

FIG. 9 is a table describing example metadata transformation performed by the value converter 124. In this example, the ETL server 400 changes the unit of the sensing data from voltage (V) to temperature (° C.), and thus converts the sensing data value and converts the number of digits of the sensing data value from ten to five.

In this case, as shown in FIG. 9, the unit entry in the metadata is changed from V to ° C., and the digit entry in the metadata is changed from ten to five.

Referring back to FIG. 8, the metadata generated by the value converter 124 is output to the metadata transmitter 108.

In the manner described above, the metadata transformer 106 processes the metadata in accordance with the process performed on the sensing data (real data) by the ETL server 400 (ETL tool). Thus, the metadata transformer 106 enables the metadata to remain properly associated with the sensing data (real data) processed by an existing ETL tool.

In the present embodiment, sensing data and metadata indicating the attribute of the sensing data are associated with each other with a common ID included in the sensing data and the metadata. Thus, the sensing data with the ID changed by the ETL server 400 can be unlinked from the metadata with the unchanged ID. In response to the ID included in the sensing data being changed by the ETL server 400, the metadata transformer 106 changes the ID included in the metadata to the resultant ID included in the sensing data. Thus, the metadata transformer 106 enables the metadata to remain linked with the sensing data with the ID changed by the ETL server 400.

The sensing data with the value changed by the ETL server 400 may fail to match the metadata with the unchanged value. In response to the value included in the sensing data changed by the ETL server 400, the metadata transformer 106 changes the value included in the metadata to a value matching the resultant value included in the sensing data. Thus, the metadata transformer 106 enables the metadata to remain matching the sensing data with the value changed by the ETL server 400.

5. Operation
5-1. Data Format Conversion

Figure 10:
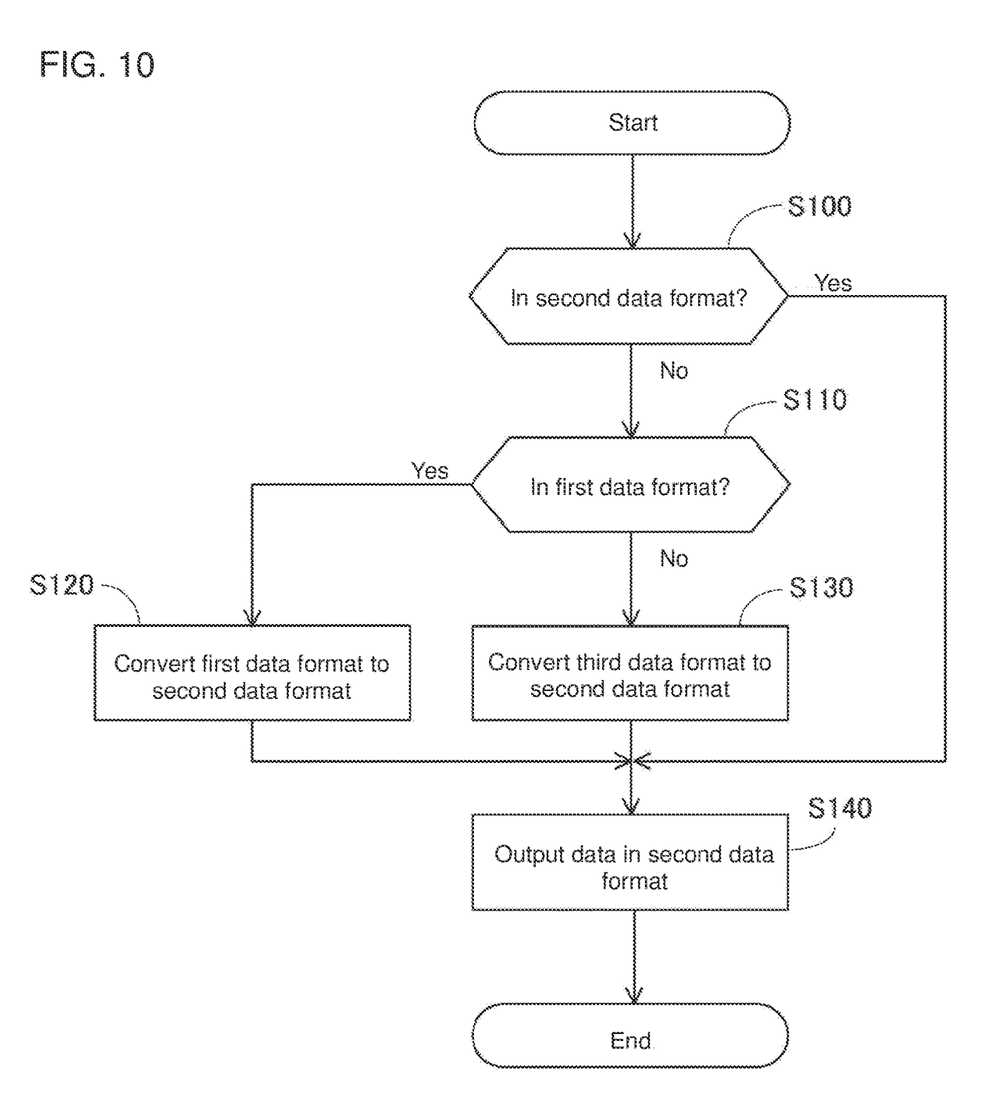
FIG. 10 is a flowchart illustrating an example procedure for data format conversion performed by a data format converter.

FIG. 10 is a flowchart showing an example procedure for data format conversion performed by the data format converter 102. The process shown in this flowchart is started by the controller 170 (data format converter 102) in response to an input of data stored in the sensing data DB 200 into the data format converter 102.

Referring to FIG. 10, the controller 170 determines whether the input data is in the second data format (step S100). In response to determination that the input data is in the second data format (Yes in step S100), the processing advances to step S140.

In response to determination that the input data is not in the second data format (No in step S100), the controller 170 determines whether the input data is in the first data format (step S110). In response to determination that the input data is in the first data format (Yes in step S110), the controller 170 converts the format of the input data from the first data format to the second data format (step S120).

In response to determination that the input data is not in the first data format (No in step S110), the controller 170 converts the format of the input data from the third data format to the second data format (step S130). The controller 170 then outputs data in the second data format (step S140). This converts data in any format to data in the second data format output from the data format converter 102.

5-2. Metadata Transformation

Figure 11:
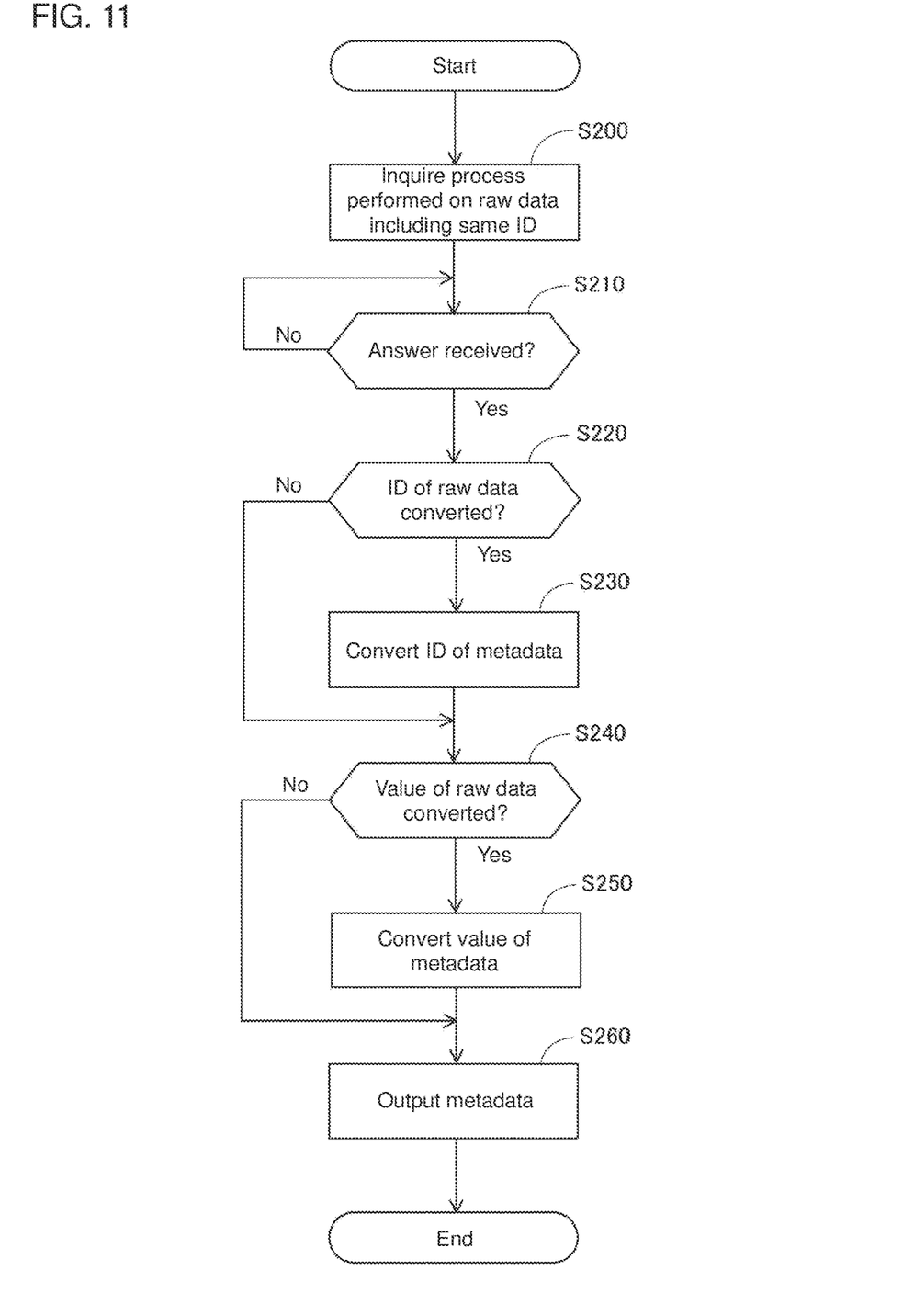
FIG. 11 is a flowchart illustrating an example procedure for metadata transformation performed by a metadata transformer.

FIG. 11 is a flowchart showing an example procedure for metadata transformation performed by the metadata transformer 106. The process shown in this flowchart is started by the controller 170 (metadata transformer 106) in response to an input of metadata into the metadata transformer 106.

Referring to FIG. 11, the controller 170 inquires the ETL server 400 about the process performed on the sensing data (real data) that includes the same ID as the input metadata (step S200). The controller 170 determines whether an answer is received from the ETL server 400 (step S210). In response to determination that no answer is received (No in step S210), the controller 170 repeats the processing in step S210.

In response to determination that an answer is received (Yes in step S210), the controller 170 determines whether the ID of the sensing data is converted by the ETL server 400 based on the received answer (step S220). In response to determination that the ID of the sensing data is unchanged (No in step S220), the processing advances to step S240.

In response to determination that the ID of the sensing data is changed (Yes in step S220), the controller 170 changes the ID of the metadata to the resultant ID included in the sensing data (step S230).

The controller 170 determines whether the value of the sensing data is converted by the ETL server 400 based on the answer received in step S210 (step S240). In response to determination that the sensing data value is unchanged (No in step S240), the processing advances to step S260.

In response to determination that the value of the sensing data is converted (Yes in step S240), the controller 170 converts the value of the metadata to a value matching the value included in the sensing data (step S250). The controller 170 then outputs the resultant metadata (step S260). This generates metadata that matches the sensing data processed by the ETL server 400.

6. Features

As described above, the data processing server 100 according to the present embodiment includes the controller 170 that converts, in response to the input data being in the first data format or in the third data format, the data format of the input data to generate output data in the second data format. In other words, the data processing server 100 outputs data in the second data format from input data in any format. The data processing server 100 thus provides data in a common data format (second data format) to a subsequent process from input data in any format, facilitating data processing in the subsequent process.

The data processing server 100 is an example of a data processing apparatus in an aspect of the present invention, the storage 180 is a memory in an aspect of the present invention, and the controller 170 is a processor in an aspect of the present invention.

7. Modifications

Although the invention has been described based on the embodiment, the embodiment may be modified variously without departing from the sprit and scope of the present invention. Such modifications will now be described. The modifications described below may be combined as appropriate.

7-1.

In the above embodiment, data stored in the sensing data DB 200 and data processed by the data processing server 100 are sensing data. In some embodiments, the sensing data DB 200 and the data processing server 100 may store or process data other than sensing data. For example, the sensing data DB 200 and the data processing server 100 may store or process data indicating the purchase history of a user at a shopping site, data indicating a score of a user at a game site, or any data other than sensing data.

7-2.

In the above embodiment, the sensing data separated by the data processing server 100 is output to the ETL server 400. In some embodiments, the sensing data may be output to a device other than the ETL server 400. For example, the data in the second data format generated by the data processing server 100 may simply be output to the analysis data DB 300.

7-3.

In the above embodiment, the metadata generated by the data processing server 100 is output to the analysis data DB 300. In some embodiments, the metadata generated by the data processing server 100 may be output to a device other than the analysis data DB 300. For example, the metadata generated by the data processing server 100 may be output to the loader 406 in the ETL server 400. In this case, the loader 406 associates the metadata with sensing data and outputs the resultant data set to the analysis data DB 300.

The invention claimed is:

1. A data processing apparatus for processing input data to generate output data, the apparatus comprising:
    a memory configured to store a program; and
    a processor configured to execute the program,
    wherein the input data is in a first data format, in a second data format, or in a third data format,
    the first data format comprises real data,
    each of the second data format and the third data format comprises real data and metadata indicative of an attribute of the real data,
    the second data format comprises the real data and the metadata in data units different from each other,
    the third data format comprises the real data and the metadata in a single data unit, and
    the program causes the processor to convert, in response to the input data being in the first data format or in the third data format, the data format of the input data to generate output data in the second data format.

2. The data processing apparatus according to claim 1, wherein
    the program further causes the processor to generate the output data in the second data format in response to the input data being in the second data format.

3. The data processing apparatus according to claim 1, wherein
    the program further causes the processor to output the real data included in the output data to an ETL tool being an extract, transform, and load tool.

4. The data processing apparatus according to claim 3, wherein
    the program causes the processor to process the metadata in accordance with a process performed on the real data by the ETL tool.

5. The data processing apparatus according to claim 1, wherein
    the real data comprises sensing data generated by a sensor.

6. A data processing method for processing input data to generate output data, the input data being in a first data format, in a second data format, or in a third data format,
    the first data format comprising real data,
    each of the second data format and the third data format comprising real data and metadata indicative of an attribute of the real data,
    the second data format comprising the real data and the metadata in data units different from each other,
    the third data format comprising the real data and the metadata in a single data unit, the method comprising:
    converting, in response to the input data being in the first data format or in the third data format, the data format of the input data to generate output data in the second data format.

7. A non-transitory computer-readable storage medium storing a data processing program, which when read and executed, causes a processor to process input data to generate output data,
    format of the input data comprising a first data format, a second data format, and a third data format,
    the first data format comprising real data,
    each of the second data format and the third data format comprising real data and metadata indicative of an attribute of the real data,
    the second data format comprising the real data and the metadata in data units different from each other,
    the third data format comprising the real data and the metadata in a single data unit,
    the program causing the processor to perform operations comprising:
    converting, in response to the input data being in the first data format or in the third data format, the data format of the input data to generate output data in the second data format.

8. The data processing apparatus according to claim 2, wherein
    the program further causes the processor to output the real data included in the output data to an ETL tool being an extract, transform, and load tool.

9. The data processing apparatus according to claim 8, wherein
    the program causes the processor to process the metadata in accordance with a process performed on the real data by the ETL tool.

10. The data processing apparatus according to claim 2, wherein
    the real data comprises sensing data generated by a sensor.

11. The data processing apparatus according to claim 3, wherein
    the real data comprises sensing data generated by a sensor.

12. The data processing apparatus according to claim 4, wherein
    the real data comprises sensing data generated by a sensor.

* * * * *